United States Patent
O'Connor et al.

(10) Patent No.: US 11,445,373 B1
(45) Date of Patent: Sep. 13, 2022

(54) VALIDATION OF POSITION, NAVIGATION, TIME SIGNALS

(71) Applicant: Satelles, Inc., Herndon, VA (US)

(72) Inventors: Michael L. O'Connor, Redwood City, CA (US); David G. Lawrence, Santa Clara, CA (US); Gregory Gutt, Vienna, VA (US)

(73) Assignee: SATELLES, INC., Herndon, VA (US)

( * ) Notice: Subject to any disclaimer, the term of this patent is extended or adjusted under 35 U.S.C. 154(b) by 567 days.

(21) Appl. No.: 16/531,334

(22) Filed: Aug. 5, 2019

(51) Int. Cl.
| | |
|---|---|
| H04L 29/06 | (2006.01) |
| H04W 12/108 | (2021.01) |
| H04L 9/32 | (2006.01) |
| H04W 12/06 | (2021.01) |
| G01S 19/03 | (2010.01) |
| H04W 12/122 | (2021.01) |
| H04L 9/00 | (2022.01) |

(52) U.S. Cl.
CPC .......... *H04W 12/108* (2021.01); *G01S 19/03* (2013.01); *H04L 9/3247* (2013.01); *H04W 12/06* (2013.01); *H04W 12/122* (2021.01); *H04L 9/50* (2022.05)

(58) Field of Classification Search
CPC .............. H04L 9/3247; H04W 12/108; H04W 12/122; H04W 12/06; G01S 19/03
See application file for complete search history.

(56) References Cited

U.S. PATENT DOCUMENTS

| | | | |
|---|---|---|---|
| 5,557,284 A | 9/1996 | Hartman | |
| 5,576,715 A | 11/1996 | Litton | |
| 7,535,402 B1 | 5/2009 | Lawrence | |
| 7,586,438 B1 | 9/2009 | Lawrence | |
| 8,837,728 B2 | 9/2014 | Enge | |
| 8,934,859 B2 | 1/2015 | Dickman | |
| 8,948,392 B2 | 2/2015 | Chassagne | |
| 2002/0120850 A1* | 8/2002 | Walker | H04L 9/3271 713/178 |
| 2008/0059059 A1* | 3/2008 | Cohen | G01S 19/10 342/357.44 |
| 2010/0191965 A1* | 7/2010 | Fischer | H04L 63/123 713/168 |
| 2016/0127901 A1* | 5/2016 | Lee | H04W 12/06 713/181 |

OTHER PUBLICATIONS

Wesson, Kyle, Mark Rothlisberger, and Todd Humphreys. "Practical cryptographic civil GPS signal authentication." Navigation: Journal of the Institute of Navigation 59.3 (2012): 177-193.

\* cited by examiner

*Primary Examiner* — Jeffrey C Pwu
*Assistant Examiner* — Thong P Truong
(74) *Attorney, Agent, or Firm* — Lempia Summerfield Katz LLC

(57) ABSTRACT

For validation of position, navigation, time (PNT) signals, a hash included in messages with PNT data is used to validate the source of the message without backhaul. Different tags from a hash chain are included in different messages. The receiver is pre-loaded with the root or later trusted hash tag of the chain as created. The hash of any received message may be hashed by the receiver. The result of the hashing will match the pre-loaded or trusted hash tag if the transmitter of the message is a valid source. The PNT data may be validated using a digital signature formed from the PNT data for one or more messages and the hash tag wherein a hash tag of the chain in a subsequently received message is used as the key. The digital signature may be formed from data across multiple messages.

34 Claims, 4 Drawing Sheets

VALIDATION OF POSITION, NAVIGATION, TIME SIGNALS

BACKGROUND

The present invention relates to position, navigation, or timing (PNT) signals. Global navigation satellite systems (GNSS) allow a receiver to determine a position from ranging signals received from a plurality of satellites. Different GNSS systems are available or have been proposed, such as the global positioning system (GPS), Gallileo or GLONASS. GNSS signals are potentially vulnerable to spoofing. Spoofing is an intentional attack in which an adversary broadcasts a false version of the navigation signal in order to cause the device receiving the signal to generate a false time or location solution.

A number of solutions have been proposed or implemented to help prevent or protect from GPS or GNSS spoofing. One proposed technique is signal processing within a GPS or GNSS receiver to detect subtle anomalies that could indicate spoofing, such as detecting an unlikely time change. Another proposed technique is antenna designs that use directionality or other techniques to identify spoofing. Complex antenna designs generally lead to larger and more expensive antennas, thereby limiting the applications in which these solutions are applicable. A Timed Efficient Stream Loss-Tolerant Authentication (TESLA) protocol has been considered for authentication or validation of the GPS signal, but the approach was summarily rejected for several reasons. The GPS signal has limited bandwidth, and TESLA would require signal changes difficult to deal with given the operational base of GPS.

GNSS satellites are in Medium Earth Orbit (MEO). Low Earth Orbit (LEO) satellites have traditionally not been considered as sources of navigation signals because, having smaller signal footprints on the surface of the Earth, a LEO constellation is required to have many more satellites to provide global coverage. In one approach for providing trusted location to a third party, where LEO satellites are the source of PNT signals, a time and location authentication solution that includes random content for PNT signals is authenticated by an authentication server. This technique does not allow the user device to validate the signal authenticity on a stand-alone basis—a back haul connection to an authentication server with direct knowledge of the random content is required for validation.

SUMMARY

By way of introduction, the preferred embodiments described below include methods and systems for validation of PNT signals. A hash or other data included in messages with PNT data is used to validate the source of the message. Without backhaul, the content of the received message may be used to validate the source and/or data. In one embodiment, a hash chain is created and different tags from the chain are included in different messages. The receiver is pre-loaded with the final hash tag of the chain. The hash of any received message may be hashed by the receiver multiple times. The result of the hashing will match the pre-loaded final hash tag created in the chain if the transmitter of the message is a valid source. In another embodiment, the PNT data may be validated using a digital signature formed from the PNT data for one or more messages and the hash tag wherein a hash tag of the chain in a subsequently transmitted and received message is used as the key. In yet a further embodiments, the digital signature is formed from data across multiple messages, providing validation of data with more efficient use of limited bandwidth.

In a first aspect, a method is provided for validation of position, navigation, time signals from a transmitter. A radio frequency receiver receives a first sequence of messages. First and second data are extracted from the messages. The second data is position, navigation, or time data spread across multiple of the messages of the first sequence. An origin of the messages is validated based on the first data. The authenticity of the second data is validated based on the first data.

In a second aspect, a system is provided for validation of a source and content of a message. A memory stores a sequence of messages. A radio frequency transmitter is configured to transmit the messages with first data usable for determination of time or geolocation of a receiver. A subset of the messages has second data usable to validate a source as the radio frequency transmitter and usable to authenticate content of the first data.

In a third aspect, a method is provided for validation of position, navigation, time signals from a transmitter of a low earth orbit satellite. A radio frequency receiver receives a message. First and second data are extracted from the message. The second data is position, navigation, or time data. An origin of the message as the transmitter of the low earth orbit satellite is validated based on the first data.

In a fourth aspect, a system is provided for validation of a source of a message. A radio frequency transmitter of a low earth satellite is configured to transmit the message with first data usable for determination of time or geolocation of a receiver and with second data usable to validate a source as the radio frequency transmitter.

In a fifth aspect, a system is provided for validation of a source of a message. A memory stores a hash chain root of a hash chain. A radio frequency receiver is configured to receive a first message from a low earth orbit satellite. The first message includes, in one burst, a first hash chain tag of the hash chain. The first hash chain tag is an earlier tag than the hash chain root in the hash chain. The first message also includes first position, navigation, or timing data used for measurement of time or geolocation. A processor is configured to hash in sequence from the first hash chain tag received in the first message and compare a result of the hash in the sequence to the hash chain root.

The present invention is defined by the following claims, and nothing in this section should be taken as a limitation on those claims. Any one or more features discussed herein may be used alone or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND THE PRESENTLY PREFERRED EMBODIMENTS

Time and location signals from a transmitter, such as a LEO satellite, are validated based on the content of the signals without the receiver having to contact a validation server. Upon receiving a message (e.g., a burst of data from an Iridium or other LEO satellite) believed to be from a particular beam (j), at time (k), the receiver validates without backhaul that the signals and/or message content are authentic. The validation is that the signal (e.g., burst) came from the satellite beam (j) as expected, and not from an attacker. Since the content of the message is used in validation, the validation may occur quickly, such as within seconds. The validation also confirms that the message content has not been tampered with or spoofed.

In one embodiment, the validation uses a hash tag from a hash chain. The chain of hash tags is created for insertion into messages. A last hash tag of the chain as created is loaded into the receiver. The other hash tags are added to messages in a reverse order. Upon receipt of a message, the receiver hashes the received hash tag. If the results of the hashing match the pre-loaded last hash tag of the chain, then there is no spoofing.

In a further embodiment, a digital signature is included in the message with the hash tag. The digital signature is formed from the hash tag and the other data of the message using a key, which is the previous hash tag of the chain as created (i.e., next tag to be transmitted in time due to the reverse order of transmit of the tags of the chain). Upon receipt, the receiver generates a digital signature using the received hash tag and data based on a key, which is the hash tag received in the next or a subsequent validation message. If the digital signatures match, then data content of the message is validated or authenticated. In further embodiments, the digital signature is formed from PNT data from multiple messages or over multiple bursts from a LEO satellite. The data authentication prevents a spoofer from corrupting the data while allowing the hash tag to be received unspoofed.

These approaches work even where the attacker knows the algorithms used throughout the system and has access to any keys stored on user equipment but does not have access to other keys that are protected within the infrastructure of the system. The attacker may have the ability to block radio frequency (RF) signals, to measure RF signals, and to generate arbitrary RF signals with arbitrary time delays. Since it is very difficult to predict the earlier hash tag in the chain as created, which tag is subsequently transmitted, the attacker is not able to generate signals that fool the receiver for any given message.

Figure 1:
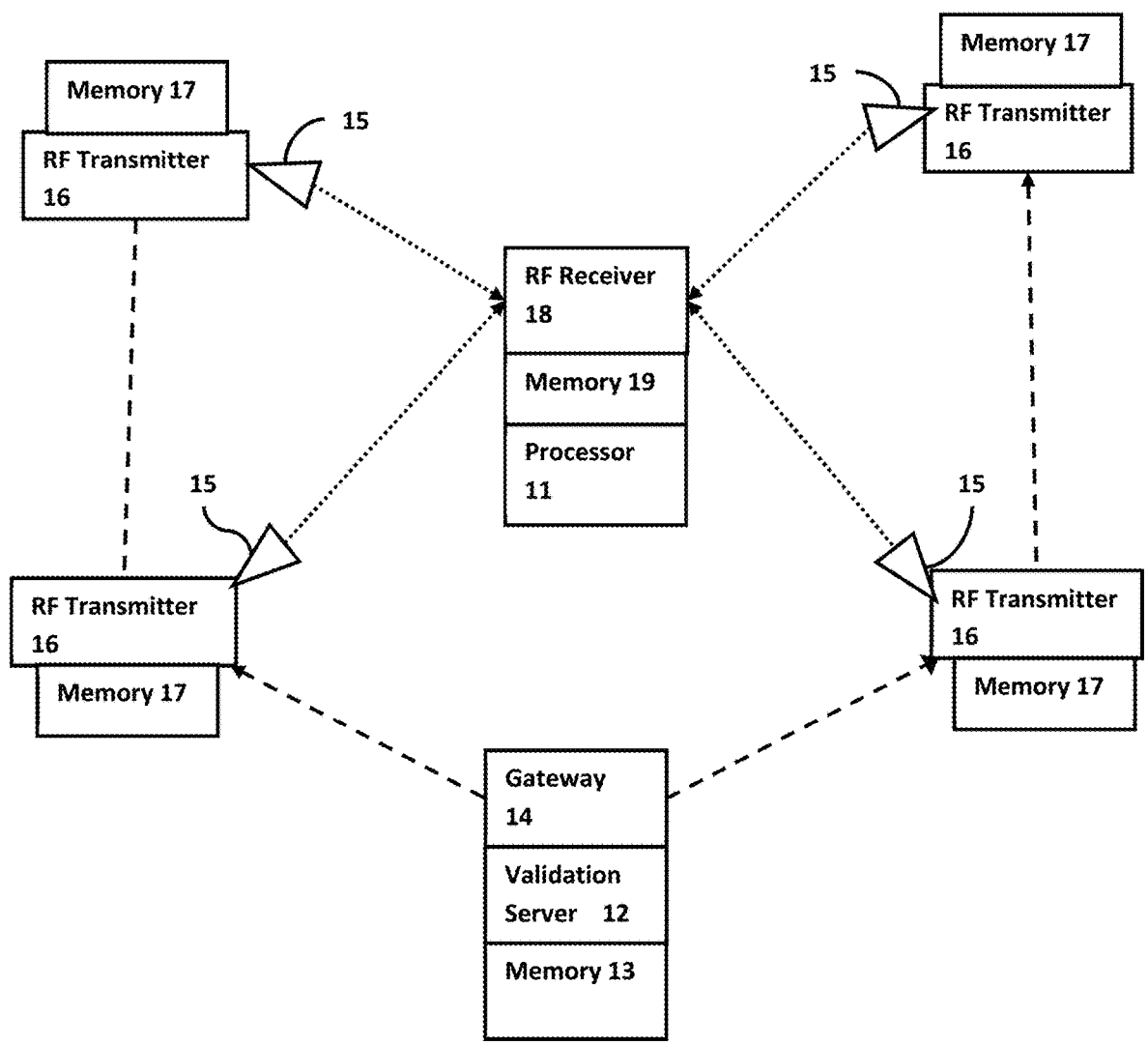
FIG. 1 illustrates of one embodiment of a system for validation of a source and/or data of a message.

FIG. 1 shows one embodiment of a system for validation of a (1) source and/or (2) content of a message or messages for PNT. The message or messages are transmitted as RF signals for use in PNT. The RF signals are used to determine geolocation and/or time. To prevent spoofing, one or more of the messages include data for source validation and/or data for content validation (e.g., data authentication). The data in the message may be used for validation and/or content authentication without backhauling (i.e., without connection or verification upon or after receipt with a server remote from the receiver).

Figure 2:
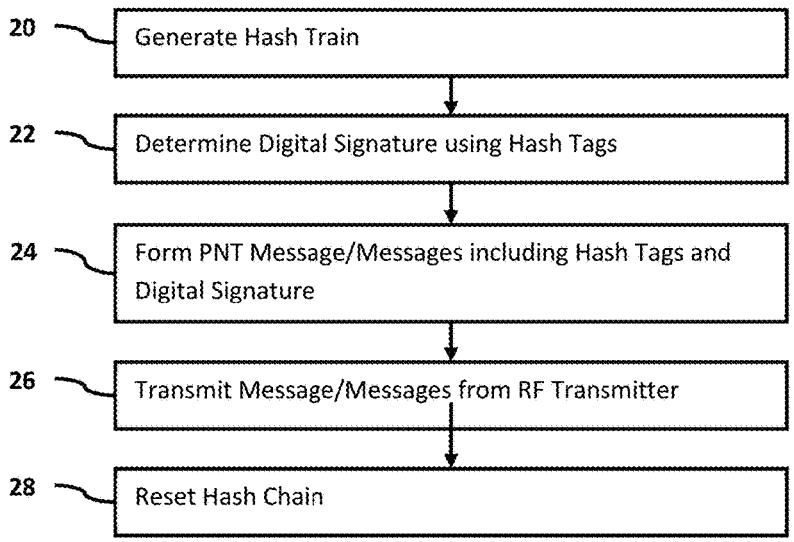
FIG. 2 is a flow chart diagram of one embodiment of a method for generating PNT messages for validation of the source and/or content of transmission.
Figure 6:
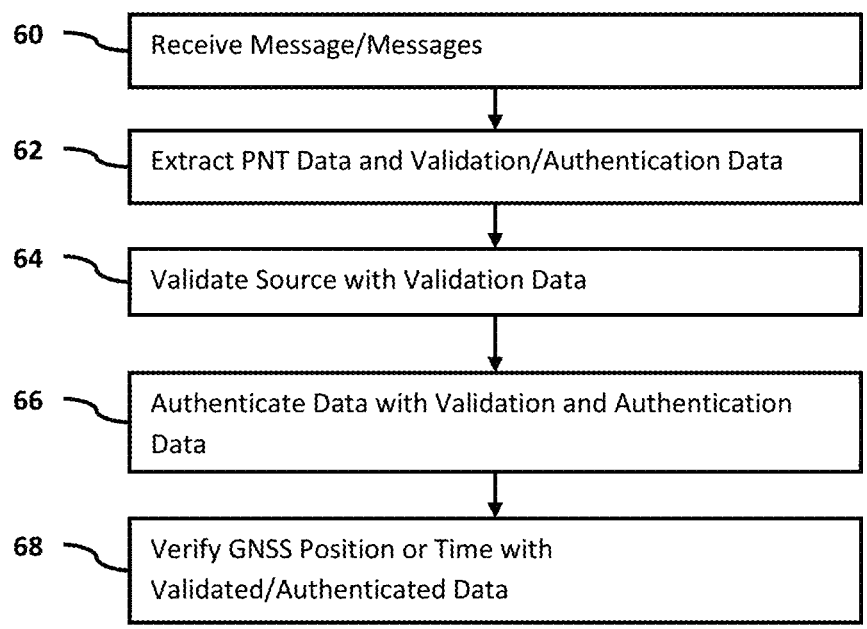
FIG. 6 is a flow chart diagram of one embodiment of a method for validation of position, navigation, time signals from a transmitter.

The system implements the method of FIG. 2, method of FIG. 6, other method, or combinations thereof. The system causes transmission of RF signals with the validation content. Alternatively or additionally, the system receives the RF signals and/or processes data in received messages to validate source and/or content.

The system includes a validation server 12, a memory 13, a gateway 14, one or more RF transmitters 16, and one or more memories 17 for generation and/or transmission of RF signals for PNT. The system includes the RF receiver 18, memory 19, and processor 11 for receipt and/or processing to validate and/or authenticate for PNT. Additional, different, or fewer components may be provided. For example, the gateway 14, validation server 12, and/or memory 13 may be duplicated. As another example, additional or fewer RF transmitters 16 and memories 17 may be provided. In yet another example, many more RF receivers 18 with memories 19 and processors 11 are provided. While shown as a whole, only the receiving side or only the transmitting side may be provided. Only the message generation may be provided.

The validation server 12 is a computer, workstation, processor, combinations thereof, or other device for generating or providing one or more hash chains and/or one or more digital signatures. In one embodiment, the validation server 12 generates messages with PNT data, hash tags, and/or digital signatures. The validation server 12 may be pre-loaded with the hash chain, digital signatures, and/or messages or may generate them as needed.

The validation server 12 is in a secure environment with the gateway 14. For example, a direct communications connection (i.e., shielded wire) connects the validation server 12 to the gateway 14 in a physically secured building or facility. The validation server 12 sends a secure message stream to the gateway 14. Encryption, secured computer network communications (e.g., encrypted tunneling), and/or other computer network security may be provided for communications between the validation server 12 and the gateway 14.

The memory 13 is a cache, random access memory, read only memory, hard drive, optical drive, flash drive, database, or other memory device for storing the hash chain, digital signature, and/or messages. The memory 13 may be collocated with the validation server 12, such as in the secure environment.

The gateway 14 includes an antenna and transmitter or transceiver for uplink and/or downlink communications with the RF transmitters 16. The gateway 14 provides messages and timing to the RF transmitters 16 for use in PNT. More than one gateway 14 may be provided, such as where the system is divided into a plurality of regions and/or for redundancy.

The gateway 14 transmits wirelessly. Data is transmitted to one or more of the RF transmitters 16. The gateway 14 may transmit to one, a subset of, or all of the RF transmitters 16. In one embodiment, the gateway 14 transmits to only one or some of the RF transmitters 16, which then transmit to others of the RF transmitters 16 to propagate messages to the network or constellation of RF transmitters 16. The gateway 14 provides the messages with validation data to one or more of the RF transmitters 16.

The RF transmitters 16 include or connect with the memory 17 for storing or buffering messages and one or more antennas 15 to transmit and/or receive messages. For example, a separate antenna 15 is provided for receiving messages from other RF transmitters 16 and/or the gateway 14, and one or more other antennas 15 are provided for broadcasting or other transmitting of the messages in a same or different format to receivers 18. The memory 17 is a buffer, random access memory, or other memory for storing messages to be transmitted.

The RF transmitters 16, memory 17, and antenna(s) 15, are each parts of a satellite in one embodiment. The satellites include the antennas 15 and a processor for controlling receiving and/or transmitting information. The satellites are LEO, geosynchronous (GSO), Medium Earth Orbit (MEO), other satellites or combinations thereof. LEO satellites have an altitude band between 400 and 1500 km. GSO satellites are at an altitude of 35,786 km, giving rise to an orbital period that matches that of Earth's rotation. If placed at the equator, the satellite will remain fixed in the sky (i.e., geostationary Earth orbit (GEO)). The vantage point offered from the distant GEO allows the GEO satellite to see more than one third of Earth. Though the closer LEO offers resolution for imaging and stronger signals for communication, GEO delivers coverage. The navigation core-constellations of GPS, GLONASS, Galileo, and BeiDou are at an altitude between LEO and GSO or in the MEO band.

Due to range, RF signals from GEO and MEO satellites can have less power than RF signals from LEO satellites as measured by a user near the surface of the Earth. As a result, poor performance is provided for indoor or other occluded environments (e.g., urban canyons). GNSS signals are often unavailable in these difficult environments simply because these low-power signals are unable to penetrate various obstructions between the satellite sources and the user.

In one embodiment, the satellites are Iridium satellites, SpaceX satellites, and/or OneWeb satellites. One satellite constellation is used, but multiple satellite constellations may be used. For example, LEO and MEO (GNSS satellites) are used together. In alternative embodiments, one or more of the RF transmitters are land or ground-based transmitters, such as peusdolites, repeaters, or transmitters that are dedicated to sending PNT signals.

Each RF transmitter 16 has a same structure, but different structures may be provided. Each transmitter 16 generates ranging signals with the same or different code and/or type of coding. The transmitter 16 includes a reference oscillator, voltage-controlled oscillators, a clock generator, a high rate digital code generator, mixers, filters, a timer and switch, an antenna 15, a microprocessor and/or a summer. Additional, different or fewer components may be provided. As an example, an oscillator, GPS receiver, microprocessor and digital-to-analog converter are provided for synchronizing the reference oscillator with the GPS system.

The RF transmitters 16 broadcast RF signals with messages to the receivers 18. Rather than a point-to-point or addressed communication, the satellites broadcast messages. The messages are broadcast as separate bursts or frames. The messages may be distinguished from each other by separate headers, format, timing (e.g., TDMA), frequency (e.g. FDMA), and/or bursting in the transmission.

For some LEO satellites, the RF transmitters 16 transmit the messages in bursts. The RF signal is a series of discrete bursts of signal energy rather than a continuous signal. For GNSS satellite constellations, a continuous signal is used.

Each LEO satellite transmits the messages in one or more beams. LEO satellites may have several antenna beams each focused on different regions of the satellite's overall footprint. Each beam might service an area much smaller, such as on the order of 100 times smaller, than the footprint of a geosynchronous earth orbit satellite used for GPS signals from MEO satellites. For example, each LEO satellite transmits in 48 beams.

In one embodiment, the RF transmitters 16 of LEO satellites transmit structured time and location signals. For example, quadrature phase shift keying (QPSK) data at a beginning of a burst forms a continuous wave marker to be used for signal detection. The remaining QPSK data in the signal is organized into pseudo-random sequences to be used for PNT. Other formats may be provided, such as QPSK without the continuous wave marker. Other data for PNT may be included, such as timing (e.g., biases) and/or orbital parameter data. The same or different format may be used for other RF transmitters 16, such as for GNSS or ground-based transmitters.

One or more of the messages includes validation data. The source and/or content validation data is transmitted with the data for PNT.

The RF receiver 18 is an oscillator, phased-lock-loop circuit, field programmable gate array, application specific integrated circuit, multi-thread processor, signal processor, general processor, graphics processing unit, correlation processor, digital circuit, analog circuit, combinations thereof, or other device for PNT processing. The RF receiver 18 is a navigation or timing receiver for receiving and correlating to determine PNT from RF signals from one or more of the RF transmitters 16. The receiver 18 connects with one or more, such as two or three, antennas. The antennas receive and pass to the RF receiver 18 one or more of the following types of signals: GNSS signals, GSO signals, LEO signals, or ground-based signals. Using tracking or correlation based on code phase, carrier phase, or both code and carrier phases, the RF receiver 18 determines locations of the one or more antennas and/or timing.

The processor 11 is a processor of the RF receiver 18, such as used for correlation for PNT. Alternatively, the processor 11 is a separate device for extracting data from a received message and/or for validation. For example, the processor 11 is a separate field programmable gate array, application specific integrated circuit, multi-thread processor, signal processor, general processor, graphics processing unit, correlation processor, digital circuit, analog circuit, combinations thereof, or other device for validation and/or authentication from received data or messages.

The memory 19 is a cache, random access memory, hard drive, flash drive, optical drive, combinations thereof, or other memory for storing received messages, sequences for correlation, extracted data, a hash tag root, and/or other information used in PNT and/or validation. The memory 19 is part of or used by the RF receiver 18.

The memory 19 stores a hash tag root. The hash tag root may be added to the memory in a secure environment and/or in a secure way. For example, a password, encryption key, or other authentication is required to load and/or change the hash tag root. As another example, the hash tag root is only changed in a secure environment, such as connected to a trusted device and/or in a locked-down facility. In one embodiment, the RF receiver 18 is initialized or started in a trusted environment in which a hash chain tag received by the receiver is presumed to be trusted, and this trusted tag is loaded to the memory 19 and is used in lieu of or as a hash tag root for validating future messages. The initialization may also synchronize a timer, such as to sub-microsecond accuracy. In another embodiment, the memory 19 is pre-loaded with a trusted key or keys. On start-up, the hash tag root is added or changed based on verification using the trusted key or keys. The start-up may also synchronize a timer, such as to 1 second or better accuracy.

FIG. 2 shows one embodiment of a method for generating data for validation of source and/or content in message content. The method is implemented by the gateway portion of the system of FIG. 1. For example, the validation and/or authentication data to be included in the messages transmitted from the RF transmitters 16 and to be used by the RF receiver 18 and/or processor 11 to validate or authenticate is generated or provided by the validation server 12 and/or from the memory 13.

The acts are performed in the order shown or another order. Additional, different, or fewer acts may be provided. For example, act 28 is not provided. As another example, act 22 is not provided.

In act 20, the server 12 or a different processor generates data for source validation. To validate the source of transmission as not belonging to a spoofer, data that can be verified by the RF receiver 18 as being trusted is generated.

In one embodiment, the validation data is a plurality of hash tags from a hash chain. A hash chain is generated. A very long hash chain is generated for RF transmission. For LEO, a separate hash chain is generated for each LEO satellite or for each beam (e.g., 48 hash chains for the 48 beams (j)). For Iridium, 3,168 hash chains are created for the 48 beams of the 66 LEO satellites. For GSO or MEO (e.g., GNSS satellites), one hash chain is generated for each satellite. For land-based transmitters 16, one or more hash chains are generated for each transmitters 16.

The hash chain is of any length, such as hundred of thousands or millions of sequential tags. For example, the hash chain includes sufficient tags to provide for sequential transmission over days, weeks, or months. In one embodiment, 20 years of hash chains for the system are generated and stored in the memory 13.

The hash chain is generated using any hashing algorithm or cryptographic hash function. For example, MD5 or SHA-256 hash is used. Any source of the original value to be hashed may be used. For example, a measure of background radiation in space is used.

Figure 3:
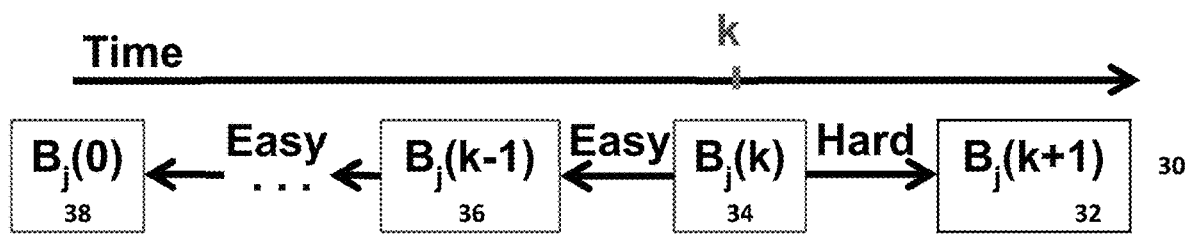
FIG. 3 illustrates generation of a hash chain according to one embodiment.

FIG. 3 illustrates the hash chain. A secret tag $B_j(N)$ is acquired, such as the measure of background radiation. This original secret tag for the chain is then hashed. The result of the hash is then hashed. The results from the subsequent hashings are hashed in sequence to form the chain. Repeated hashing provides a chain of hash tags: $B_j(N) \rightarrow B_j(N-1) \rightarrow \ldots \rightarrow B_j(1) \rightarrow B_j(0)$. The last hash chain tag generated is $B_j(0)$, the hash tag root as used for validation.

For validation, the RF receiver 18 knows the hash algorithm used to create the chain and the last hash chain tag $B_j(0)$. The hash tags of the chain are added to PNT messages from the RF transmitters 16 in reverse order. The first message in time includes $B_j(0)$ or $B_j(1)$. Given a tag $B_j(k)$ and the value of k, the processor 11 applies the hash algorithm k times to confirm that the result is the expected $B_j(0)$ or applies at least one time to confirm that the result is the expected hash (e.g., from the previous message).

Any spoofer would require a very large amount of processing power and/or time to predict $B_j(k+1)$, so that hash chain tag cannot be predicted to then spoof the next message. Since the hash chain tags are transmitted in reverse order, the received hash chain tag may be used to validate the source of the signal and any spoofer would be unlikely able to use the information to spoof subsequent messages.

In one embodiment, the Timed Efficient Stream Loss-tolerant Algorithm is used for validation. Other approaches using the hash chain tag may be used. Other chains created with an algorithm other than hashing may be used. In addition to the previous hash tag, the input to the hash may include the index k, a cryptographic "salt", or another cryptographic feature to make the hash chain more difficult to attack. Any data process generating a directional sequence of values may be used for generating the validation data as tags to be transmitted in a reverse order.

In act 22, the server 12 or another processor determines and/or causes storage in the memory 13 of one or more digital signatures. The digital signature is to authenticate the data content of a message or messages. The digital signature is generated from data previously transmitted and/or to be transmitted in the messages. By generating another digital signature in the same way from the data as received, the digital signatures may be compared. If the same key is used and the key is secure, then matching digital signatures indicates that the data has not been changed. The data is authenticated.

Since the earlier generated and later transmitted hash chain tag is hard to predict, this hash chain tag may be used as the key. In the secure environment of the validation server 12, the hash tags are available for use as keys. At the RF receiver 18, the key (next transmitted hash chain tag) is received in a subsequent message. Once that subsequent message is received, the key is available for generating the digital signature. The authentication or validation of the data content cannot be checked until the next epoch (i.e., until the next hash chain tag is received). Key management is provided as part of the source validation rather than having to manage decryption keys. The RF receiver 18 may validate or authenticate the data content without communication at the time with a separate server.

Any digital signature generation algorithm may be used. Any encryption or compression may be used. For example, message authentication code (MAC) is used.

Any data of the message may be used to form the digital signature with the key. For example, the hash chain tag sent in the message is used. As another example, data used for PNT included in the message, subsequent message, and/or future message is used, such as the pseudo-random sequence for QPSK, timing bias, and/or orbital parameters. In one embodiment, the digital signature is generated from both the hash chain tag and data for PNT. For LEO, burst k of beam j is a message that contains a hash chain tag, $B_j(k)$, of any number of bits (e.g., about ½ the number of bits of the message), PNT data, $D_j(k)$ of any number of bits (e.g., about ⅓ the number of bits of the message), and a digital signature, MAC(k), of any number of bits (e.g., about ⅙ the bits of the message). The digital signature is formed from the other message content $[B_j(k)|D_j(k)]$ using the next to be transmitted hash chain tag, $B_j(k+1)$, as the key.

Figure 4:
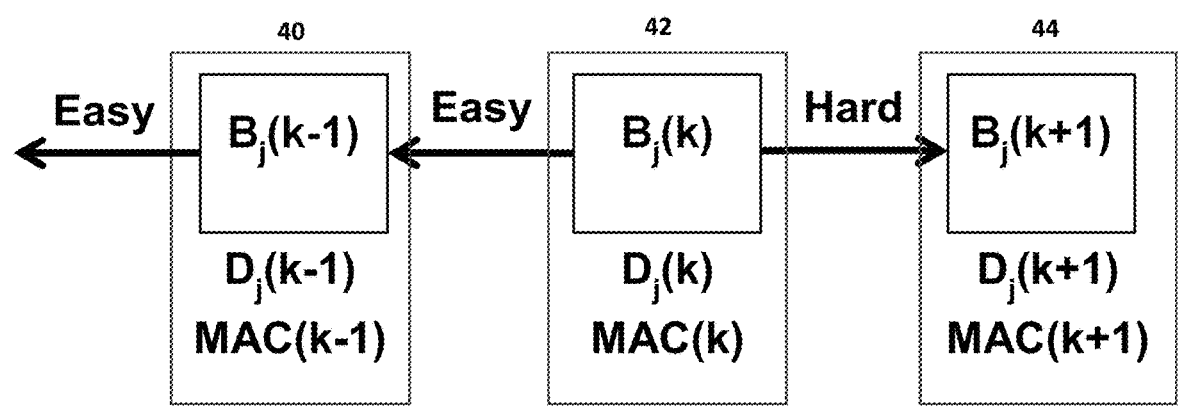
FIG. 4 illustrates an example directionality of predicting hash tags relative to transmitted messages.

FIG. 4 shows an example of a sequence of messages. There are no intervening messages in one embodiment. In other embodiments, there are intervening messages. The sequence is for transmission of the message 40, then the message 42, and then the message 44. At the time of receipt of the message 42, the hash chain tag $B_j(k+1)$ to be used as the key has not been received and may not be predicted from the previously transmitted or broadcast hash chain tags $B_j(k), B_j(k-1), \ldots B_j(0$ or $1)$. Thus, the digital signature MAC(k) cannot be generated by the receiver 18 prior to receiving message 44. Once message 44 is received, then the received data $B_j(k)$ and $D_j(k)$ are used to generate a digital signature using the key $B_j(k+1)$. If the digital signature from the received data matches the received digital signature MAC(k), then the data is authenticated or validated. If the data of message 42 is altered, such as by spoofing, then the digital signatures will not match.

Figure 5:
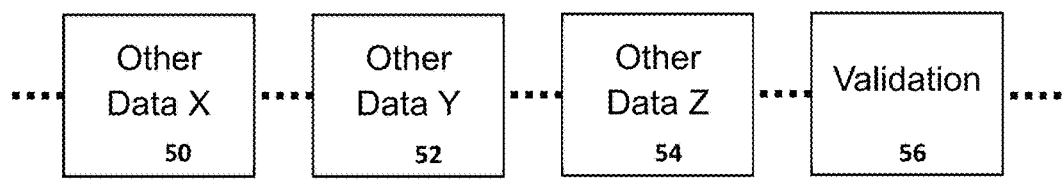
FIG. 5 illustrates a sequence of messages including one message with data for source validation and/or data authentication.

FIG. 5 shows another embodiment. A sequence of messages is transmitted. Not all messages contain a hash chain tag for data or bandwidth efficiency. In the LEO embodiment, a sequence of bursts and corresponding messages are transmitted. Any number of messages may be used in the sequence, such as four messages in the example of FIG. 5. Multiple sequences are transmitted in succession.

One of the messages 50, 52, 54, 56 is a validation message. In the example of FIG. 5, the last message 56 of the sequence is the validation message. Other positions in the sequence may be used for the validation message.

The validation message 56 has the format discussed above, such as one of the messages shown in FIG. 4. Other formats may be provided, such as not including the digital signature. The data for PNT may be included in the validation message 56. Not all of the data needed by the RF receiver for PNT is included in the validation message 56. The other messages 50, 52, and 54 include the other data X, Y, Z for PNT.

The digital signature in the validation message 56 is formed from data from multiple of the data in messages 50-56. This allows the digital signature check to authenticate the data from the messages 50-56 of the sequence even though the "other data" is not included in the validation message 56. For example, the validation message includes the hash chain tag $B_j(k)$, the data $D_j(k)$ for PNT, and the digital signature MAC(k). The digital signature is formed from the content of the messages 50-56 of the sequence: [$B_j(k)$|$D_j(k)$|Other Data X|Other Data Y|Other Data Z] using the next to be transmitted hash chain tag $B_j(k+1)$ as the key.

In act 24, one or more messages are formed. The messages include the hash chain tags and/or digital signatures. For example, the message or messages of FIG. 4 or 5 are formed. The validation server 12 forms the messages and/or provides the messages from the memory 13 to the gateway 14.

The messages for the different RF transmitters 16 are uploaded to the memories 17 of the RF transmitters 16. In LEO, the messages for the LEO satellites are the same in each of the beams of a given satellite but different for the different satellites. Alternatively, different hash chain tags are used for different beams of a same satellite, or the same hash chain tags are used in multiple satellites.

In act 26, the RF transmitters 16 transmit the messages in order. Using synchronized clocks of the RF transmitters 16, the messages are transmitted from the different RF transmitters 16 with the same or similar timing. In LEO, multiple radio beams on each satellite (e.g., 3168 beams across 66 satellites) transmit messages. Bursts of radio signals containing PNT data are synchronized with each other on regular frames. The integer representing the timing of these frames is used as the index, k, to the hash chain.

The RF signals for PNT are transmitted. The signals include messages with the data for validation of the source and/or the content. The message or messages with data usable for determination of time or geolocation of the RF receiver 18 are transmitted. The data for validation and/or the data usable for determination of time or geolocation may be augmented by forward error correction. For example, the RF signal includes information about the location, velocity, and/or clock bias of the satellite. The RF signal may include code or phasing information to determine position or timing. For example, a code division multiple access code is transmitted from each of the satellites, such as broadcasting QPSK messages within bursts of RF data. For LEO, the bursts contain discrete messages. There may be different message types with different sets of data. Information within each message or some messages may include clock biases, orbital parameters, or validation messages.

All or a subset of the messages have data usable to validate a source as the radio frequency transmitter and/or usable to authenticate content of the data. For example, the data for validation of source is based on a Timed Efficient Stream Loss-tolerant Algorithm. The data allows a user to validate with high probability that the signal originated from the expected source of the signal.

In one embodiment, the data for validation includes a hash chain tag from a sequence of hash chain tags being transmitted in reverse order. The hash chain tag has a known, transmitted, or determined sequence number such that hashing the hash chain tag a number of times corresponding to the sequence number results in a hash chain root. The results of the hashing should result in the hash chain root being a same as a stored hash chain root, validating the source.

In another embodiment, the data for validation includes a hash chain tag and a digital signature. The original digital signature was formed from the hash chain tag of that message and the data for PNT of that message or a sequence of messages using another hash chain tag as a key. The other hash chain tag is to be transmitted from a subsequent message by the RF transmitter 16. For example, any validation messages include a hash chain, a small amount of data, and a MAC. The MAC in the validation message signs data in the validation message or the validation message plus data from other messages in a stream. For example, the sequence or stream has messages including the clock biases and orbital parameters (e.g., location and/or velocity of the satellite). The digital signature is for one instance of all of this data. In this way, the source of the data may be validated, and the data integrity itself may also be validated. A hash chain element broadcast at a future time may be used as the digital signature key for the present message.

In act 28, the hash chain is reset. A different hash chain is created from a different measurement or source. The different hash chain has a different final or root tag. The reset may prevent susceptibility to brute-force or other crypto attacks.

The hash chain is reset periodically (e.g., from time to time), such as every week or month. The hash tag chain is not a continuous chain that effectively goes on forever. The reset may be asynchronous, such as a system operator or event triggering the reset. The reset may occur at a relatively arbitrary time.

The validation server 12 loads or creates the new hash chain and starts providing messages using tags from the new hash chain. For validation, the hash chain root stored in the memory 19 is replaced to be the final hash chain tag of the new hash chain. This replacement happens in a secure way or environment. In one embodiment, the validation from the previous hash chain root is relied upon for security, so the new hash chain root is transmitted in a message. In other embodiments, the replacement happens at a secure facility and/or with encryption of data.

Before a given reset, one hash chain is used for source validation. After reset, a different hash chain is used for source validation. The transmitted messages from different times are based on different hash chain roots.

FIG. 6 shows a flow chart of one embodiment of a method for validation of PNT signals from a transmitter 16, such as from a transmitter of a LEO satellite. Data in a message or messages from the transmitter 16 is used to validate a source of the message or messages and/or authenticate content of the message or messages.

The system of FIG. 1 or another system implements the method of FIG. 6. For example, the acts of FIG. 6 are performed by an RF receiver 18, processor 11, and/or devices local (e.g., in a same building or within 100 meters) to or sharing a housing with the RF receiver 18. Other devices may be used.

The acts are performed in the order shown or another order. Additional, different, or fewer acts may be provided. For example, act 66 and/or act 68 are not provided. As another example, an act for loading a different hash tag root into the receiver is provided. When the hash chain is periodically or asynchronously reset, the new or replacement hash tag root is inserted or stored at the receiver in a trusted or secure way.

In act 60, a receiver, such as the RF receiver 18, receives one or more messages. A sequence of messages (e.g., see FIG. 5) may be received. The messages transmitted from a satellite or other RF transmitter 16 for PNT are received. For LEO, the messages may be received in sequential bursts. Alternatively, frame or message headers separate the messages.

Different messages have different content. For example, a validation message includes data for validation and data for PNT. Different data for validation, such as different hash chain tags and/or digital signatures, are provided for different messages. Some messages may have data for PNT without hash chain tags and/or digital signatures.

For validation of source and/or authentication of data for a given message, validation information from a later transmitted message may be used. For example, a hash chain tag from a subsequent message is used as a key for creating a digital signature. In other embodiments, the validation of a message uses data from that message. Based on a sequence number in the hash chain, a received hash chain tag is hashed a number of times. The result is compared to a stored hash chain root.

In act 62, the different types of data are extracted from the message or messages. The receiver 18 or processor 11 extracts based on the message format. For example, validation data is extracted from a given range of bits, and data for PNT is extracted from a different range of the bits. In extracting the validation data, a hash chain tag is extracted. A sequence number for the hash chain tag is counted locally or may be extracted from the received message. A digital signature may be extracted. Hash chain tags may be extracted from different messages, such as using the hash chain tag from a later message as a key for creating a digital signature from received data for comparison to a received digital signature.

The data for PNT may be extracted. The data for PNT may be coding or phasing information. In one embodiment, the data for PNT is timing biases and orbital parameters used for PNT based on correlation with QPSK in the RF signal. The data for PNT from one message may be used alone to determine geolocation and/or time. Alternatively, the data for PNT is spread over multiple messages of a sequence. The data for PNT from the multiple messages may be used to determine geolocation and/or time. Data from other messages may be used to update or determine again the geolocation and/or time.

In act 64, the receiver 18, such as the processor 11, validates an origin of the message or messages as the transmitter 16 based on the validation data extracted from the message or messages. The validation is that the source may be trusted, such as validation that a transmitter 16 of the system or intended transmitter delivered the message. The validation is that the message is not delivered by a spoofer using a different transmitter. For example, the message is validated as having been received from a LEO satellite of a constellation used for a given receiver 18. Only a trusted source would have the correct hash tag or other validation data.

In one embodiment, the validation is based on a Timed Efficient Stream Loss-tolerant Algorithm. The validation may use a hash tag root, such as the last hash tag of a chain in creation. A received hash tag in a message is from a given number of hashes prior to the hash tag root. By hashing that number of times using a same hash algorithm, the resulting hash tag equals the hash tag root. If the resulting hash tag after hashing does not equal the hash tag root, the message may not be trusted. In alternative embodiments, the hash tag of the message is hashed only once or a number of times less than the number leading to the end of the chain. As each hash tag from earlier messages is validated, the resulting hash tag is validated. As a result, the next hash tag may be validated against the earlier hash tag (i.e., the root is sequentially updated in an ongoing manner). The user validates the source by hashing a received tag and comparing to an element of the hash chain that was previously received, is stored in memory, and is considered to be trusted. One or more iterations of hashing from the current hash tag may be used for matching.

The hash tag root or initial hash tag root is added to the memory of the receiver in a secure manner. The trusted hash tag root may be received from an RF signal source, such as a short distance (e.g., Bluetooth) transmitter in a secure environment. The trusted hash tag root may have been received from direct connection, such as a flash drive or cable to a computer. The trusted hash tag may have been received from the RF transmitter 16.

The hash chain tag of a given message is hashed one or more times to compare with the hash tag root. The comparison is without call to a remote server. The receiver 18 may not be able to communicate with another device. By using the content of the message and the stored hash chain root, external calls to validate are not needed.

In act 66, the receiver 18, such as the processor 11, validates authenticity of the data of the message. The data for PNT from one or more messages is authenticated. The validation data is used in the authentication. The authentication verifies that the received data was not likely tampered with.

In one embodiment, the validation data includes a digital signature formed from the data for PNT and the hash tag or hash tags to be sent with one or more messages. A hash tag to be sent after the messages is used as the key. When that subsequent hash tag is received by the receiver 18, the receiver repeats the creation of the digital signature using the received data and the later received key (i.e., later received hash tag). The digital signature received as validation data and created from data prior to transmission or in a secure environment is compared against the digital signature created using the same key and from received data that should be the same. If the received message data is the same, the digital signatures will be the same or match. If the data was altered in transit, then the digital signatures will not match.

In act 68, the receiver uses the data for PNT to determine a geolocation, time, or navigation. In one embodiment, the data for PNT is processed to determine a geolocation and/or time. The geolocation may be a partial location, such as a longitudinal or latitudinal location or a distance from the transmitter 16. Correlation and/or other processes are used to determine the location and/or time information.

The determined location or time may be used for positioning, navigation or time. The data from the validated source and/or authenticated data is used to determine the location or time. For example, LEO signal bursts are received about once every second on average. If coarse time and geolocation are known, such as in the case of a stationary receiver with a network connection or a receiver with a calibrated clock, then precise time may be calculated by processing a single burst, typically in under 2 seconds. A receiver may reliably decode the LEO bursts and perform precise Doppler and/or range measurements at attenuations of up to 39 dB or more relative to unobstructed reception. This is sufficient to penetrate buildings and other occlusions, providing coverage in most deep indoor and urban canyon environments. The location within a city and/or indoors may be determined from ranges to multiple LEO satellites through triangulation or from ranges at different times to a moving LEO satellite.

The precise time and frequency information derived from one or more bursts may be used to assist weak-signal GNSS acquisitions. Since the LEO signal is more robust than GNSS, precise assistance is provided to acquire GNSS signals as weak as −160 dBm, assuming that the LEO and GNSS signals are attenuated similarly by path occlusions. In environments where both GNSS and LEO time and location fixes are possible, the GNSS fixes will generally be more accurate. One advantage of LEO is its ability to provide time and position fixes under conditions where GNSS is not available due to occlusions or other issues. In this respect, GNSS and LEO can be seen as complementary technologies, and the receiver supporting both allows verification of GNSS position or time based on the position or time information from LEO. The validated and/or authenticated LEO position and/or time may be used to check the GNSS position or time. If the GNSS is being spoofed or there is interference, the lower accuracy LEO-based position and/or time may be used. Where the validated LEO-based position and/or time matches the GNSS position or time, within any desired tolerance, then the validated LEO-based position and/or time may indicate that the GNSS position and/or time may be trusted. For example, the secure data steam and associated PNT measurements from LEO satellites are used to validate GPS. The location and/or time from terrestrial transmitters may be validated by using the messaging and/or by comparison to position or time from LEO or other transmissions that have been validated and/or authenticated.

In one embodiment for transmission of validation signals, a system or method includes one or more low-earth-orbit satellites. The low-earth-orbit satellites transmit one or more RF signals to a user (e.g., receiver). At least one of the RF signals is suitable to allow the user to measure a pseudorange, a time-of-arrival, a Doppler shift, and/or other measurements suitable for use in computing an accurate time and/or geolocation of the user. The RF signals that are suitable for navigation include digital data. The digital data includes a portion of data that allows a user to validate with high confidence that the RF signal originated from the expected source of the signal, and not from a third party.

In another embodiment for transmission of validation signals, the system or method uses digital validation to validate the source of the message and the data on the message. Any transmitters, not just LEO satellites, may be used. The transmitters transmit one or more RF signals to a user. At least one of the RF signals is suitable to allow the user to measure a pseudorange, a time-of-arrival, a Doppler shift, and/or other measurements suitable for use in computing an accurate time and/or geolocation of the user. The RF signals that are suitable for navigation are include a series of digital data messages that are transmitted sequentially in time. A first subset of the digital data messages contains a first portion of data that allows a user to validate that the RF signal originated from the expected source of the signal and not from a third party. A second subset of the digital data messages contain other data. A data validation, such as a Message Authentication Code or Digital Signature, can be used to validate the authenticity of some of the first portion of data and some of the second portion of data.

In other embodiments for validation, systems and methods are provided for the user equipment side of the system. In one approach, an RF signal is received from a LEO satellite. The signal is used to measure a pseudorange, a time-of-arrival, a Doppler shift, and/or other measurements suitable for use in computing an accurate time and/or geolocation of the user. A portion of data is extracted. That portion may be processed to assess whether the signal originated from the expected source of the signal or from a third party.

In another approach for validation, a series of digital data messages transmitted sequentially in time are received from an RF transmitter, which may be a LEO satellite, MEO satellite, GSO satellite, or ground based transmitter. One or more of the digital data messages are used to measure a pseudorange, a time-of-arrival, a Doppler shift, and/or other measurements suitable for use in computing an accurate time and/or geolocation of the user. A first set of the digital data messages are used to extract a first portion of data. A second set of the digital data messages are used to extract a second portion of data. The first portion of data may be used to validate whether the signal originated from the expected source of the signal or from a third party. Further processing of the first portion of data may be used to validate the authenticity of the data contained in the second portion of data.

In another embodiment, the time is used to guard against a long-delay reply attack. A moderately accurate clock estimate (e.g., better than 1/10th of a second) from a different source is used to guard against a long-delay replay attack. A time is estimated based on RF signals from the validated the source of the RF signals. The signal and the validated data are used to compute a time estimate. The moderately accurate measure of time is acquired from a different source. For example NTP, PTP, or other internet protocol for time transfer is used to acquire the measure of time from a computer network. As another example, the receive equipment has a local clock that runs continuously (e.g., uses a battery) and keeps time even when the user equipment is turned on and off. The validated time estimate is compared with the moderately accurate time from the different source. If the two times differ by a large amount (e.g., 2 seconds or more where the moderately accurate measure of time is 1/10th of a second), then the user is likely the subject of a long-delay replay attack, and the time estimate is not trusted.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for validation of position, navigation, time signals from a transmitter, the method comprising:
receiving, at a radio frequency receiver, a first sequence of messages;
extracting first data from the messages, wherein extracting the first data comprises extracting a first hash chain tag and a first digital signature;
receiving by the radio frequency receiver a subsequent message including a second hash chain tag
extracting second data from the messages, the second data being position, navigation, or time data spread across multiple of the messages of the first sequence;
validating an origin of the messages as an expected origin based on the first data; and
validating authenticity of the second data based on the first data, wherein validating the authenticity comprises creating a second digital signature from the first hash chain tag and the second data with the second hash chain tag received in the subsequent message and comparing the second digital signature to the first digital signature.

2. The method of claim 1 wherein receiving comprises receiving the first sequence as signals from a low earth satellite, and wherein validating the origin comprises validating the origin as the low earth orbit satellite.

3. The method of claim 2 wherein receiving the first sequence as signals from a low earth satellite comprises receiving bursts as the signals from the low earth satellite.

4. The method of claim 1 wherein validating the origin comprises hashing the first hash chain tag and comparing results of the hashing to a trusted hash chain tag.

5. The method of claim 4 wherein the trusted hash chain tag is received from the transmitter while the receiver is in a known and trusted environment.

6. The method of claim 4 wherein the trusted hash chain tag is a hash chain root.

7. The method of claim 6 wherein comparing comprises comparing the results to the hash chain root, the hash chain root stored at the radio frequency receiver, the comparing being without a call to remote server.

8. The method of claim 7 wherein comparing comprises comparing to the hash chain root as trusted data based on security of installation at the radio frequency receiver.

9. The method of claim 7 further comprising:
resetting the hash chain root periodically or asynchronously.

10. The method of claim 6 wherein extracting comprise extracting the first hash chain tag where the first hash chain tag has a sequence number, and wherein hashing comprises hashing the first hash chain tag a number of times based on the sequence number.

11. The method of claim 1 wherein validating the origin comprises validating based on a Timed Efficient Stream Loss-tolerant Algorithm.

12. The method of claim 1 further comprising verifying a global navigation satellite system position or time based on the second data after validating the origin and the authenticity.

13. A method for validation of position, navigation, time signals from a transmitter, the method comprising:
receiving, at a radio frequency receiver, a first sequence of messages;
extracting first data from the messages;
extracting second data from the messages, the second data being position, navigation, or time data spread across multiple of the messages of the first sequence;
validating an origin of the messages as an expected origin based on the first data; and
validating authenticity of the second data based on the first data;
calculating a time estimate from the signal and the second data, comparing the time estimate to a clock estimate from a different source, and identifying a long-delay replay attack from the comparison.

14. A system for validation of a source and content of a message, the system comprising:
a memory storing a sequence of messages;
a radio frequency transmitter configured to transmit the messages with first data usable for determination of time or geolocation of a receiver, a subset of the messages having second data usable to validate a source as the radio frequency transmitter and usable to authenticate content of the first data, wherein the second data comprises a first hash chain tag and a first digital signature, the first digital signature formed from the first hash chain tag and the first data of the messages using a second hash chain tag as a key, the second hash chain tag from a subsequent message of the radio frequency transmitter.

15. The system of claim 14 wherein the radio frequency transmitter comprises a low earth orbit satellite transmitter configured to transmit the messages as bursts.

16. The system of claim 14 wherein the first hash chain tag is from a sequence of hash chain tags to be transmitted in reverse order.

17. The system of claim 16 wherein the first hash chain tag has a sequence number such that hashing the first hash chain tag a number of times corresponding to the sequence number results in a hash chain root.

18. The system of claim 14 wherein the second data comprises information based on a Timed Efficient Stream Loss-tolerant Algorithm.

19. A method for validation of position, navigation, time signals from a transmitter of a low earth orbit satellite, the method comprising:
receiving, at a radio frequency receiver, a message;
extracting first data from the message;
extracting second data from the message, the second data being position, navigation, or time data, wherein extracting the first data comprises extracting a first hash chain tag and a first digital signature, the first digital signature as received in the message believed to have been formed from the first hash chain tag and the second data of the message using a second hash chain tag as a key;
receiving by the radio frequency receiver a subsequent message including the second hash chain tag;
validating an origin of the message as the transmitter of the low earth orbit satellite, the validating being based on the first data; and
validating an authenticity of the second data, validating the authenticity comprising creating a second digital signature from the first hash chain tag and the second data with the second hash chain tag received in the subsequent message and comparing the second digital signature to the first digital signature.

20. The method of claim 19 wherein validating the origin comprises hashing the first hash chain tag and comparing results of the hashing to a trusted hash chain tag.

21. The method of claim 20 wherein extracting comprise extracting the first hash chain tag where the first hash chain tag has a sequence number, and wherein hashing comprises hashing the first hash chain tag a number of times based on the sequence number.

22. The method of claim 20 wherein the trusted hash chain tag is received from the transmitter while the receiver is in a known and trusted environment.

23. The method of claim 20 wherein the trusted hash chain tag is a hash chain root.

24. The method of claim 20 wherein comparing comprises comparing the results to the hash chain root, the hash chain root stored at the radio frequency receiver, the comparing being without a call to a remote server.

25. The method of claim 24 wherein comparing comprises comparing to the hash chain root as trusted data based on security of installation at the radio frequency receiver.

26. The method of claim 24 further comprising:
resetting the hash chain root periodically or asynchronously.

27. The method of claim 19 wherein validating the origin comprises validating based on a Timed Efficient Stream Loss-tolerant Algorithm.

28. The method of claim 19 further comprising verifying a global navigation satellite system position or time based on the second data after validating the origin.

29. The method of claim 19 wherein receiving the message and the second message comprises receiving the message and the subsequent message as bursts from the low earth orbit satellite.

30. A system for validation of a source of a message, the system comprising:
a memory storing a trusted hash chain tag of a hash chain;
a radio frequency receiver configured to receive a first message from a low earth orbit satellite, the first message including a first hash chain tag of the hash chain, the first hash chain tag being an earlier tag than the trusted hash chain tag in the hash chain, and first position, navigation, or timing data for measurement of time or geolocation; and
a processor configured to hash in sequence from the first hash chain tag received in the first message and compare a result of the hash in the sequence to the trusted hash chain tag;
wherein the first message, in the one burst, includes a first digital signature formed from the first hash chain tag and the first position, navigation, or timing data prior to transmission based on a first key, the first key being a second hash chain tag, wherein the radio frequency receiver is configured to receive the second hash chain tag in a second message received subsequent to the first message, and wherein the processor is configured to generate a second digital signature from the first hash chain tag and the first position, navigation, or timing data as received by the radio frequency receiver in the first message using the second hash chain tag as received by the radio frequency receiver in the second message as a second key, the processor configured to authenticate the first position, navigation, or timing data based on comparison of the first and second digital signatures.

31. The method of claim 30 wherein the trusted hash chain tag is a hash chain root.

32. The system of claim 30 wherein the radio frequency receiver is configured to receive third and fourth messages with third and fourth position, navigation, or timing data, the third and fourth messages received prior to the second message, wherein the first digital signature is formed from the first hash chain tag and the first, third, and fourth position, navigation, or timing data, and wherein the second digital signature is formed from the first hash chain tag and the first, third, and fourth position, navigation, or timing data as received in the first, third, and fourth messages.

33. The system of claim 30, wherein the radio frequency receiver is configured to receive a first message from a low earth orbit satellite as a burst.

34. A system for validation of a source of a message, the system comprising:
a memory storing a trusted hash chain tag of a hash chain;
a radio frequency receiver configured to receive a first message from a low earth orbit satellite, the first message including a first hash chain tag of the hash chain, the first hash chain tag being an earlier tag than the trusted hash chain tag in the hash chain, and first position, navigation, or timing data for measurement of time or geolocation; and
a processor configured to hash in sequence from the first hash chain tag received in the first message and compare a result of the hash in the sequence to the trusted hash chain tag, wherein the processor is configured to estimate the time estimate from the first position, navigation, or timing data, compare the time to a clock estimate, and identify a long-delay replay attack from the comparison.

* * * * *